United States Patent [19]

Tarlton

[11] Patent Number: 5,762,178

[45] Date of Patent: Jun. 9, 1998

[54] CONVEYOR SPLICE BOX

[75] Inventor: Curtis S. Tarlton, Short Hills, N.J.

[73] Assignee: Nedco Conveyor Company, Union, N.J.

[21] Appl. No.: 501,207

[22] Filed: Jul. 11, 1995

[51] Int. Cl.[6] .................................................. B65G 21/00
[52] U.S. Cl. ............................... 198/860.2; 198/861.1
[58] Field of Search .............................. 198/735.3, 841, 198/860.2, 861.1

[56] References Cited

U.S. PATENT DOCUMENTS

| | | | |
|---|---|---|---|
| 3,605,994 | 9/1971 | Parlette | 198/861.1 |
| 4,183,430 | 1/1980 | Hunter | 198/735.3 |
| 4,877,127 | 10/1989 | Geppert | 198/860.3 |
| 4,967,897 | 11/1990 | Lachonius et al. | 198/841 |
| 5,029,697 | 7/1991 | McMillan et al. | 198/860.2 |

*Primary Examiner*—Joseph E. Valenza
*Attorney, Agent, or Firm*—Rohm & Monsanto

[57] ABSTRACT

A splice box arrangement for a conveyor employs first and second end members that are coupled to one another and to base and top members using conventional fasteners, obviating the need for total replacement of the splice box when a conveyor of a different width is desired to be installed. The end members have parallel angled portions extending outwardly from a central portion, the angled portions having apertures therethrough that register with corresponding apertures of the base and top portions. The apertures accommodate removable fasteners, such as threaded fasteners. Only the base and top members of the splice box need to be removed and replaced when a conveyor having a different width is installed.

18 Claims, 3 Drawing Sheets

CONVEYOR SPLICE BOX

BACKGROUND OF THE INVENTION

1. Field of the Invention

This invention relates generally to conveyor systems, and more particularly, to a splice box arrangement that simply and economically allows the width of a continuous chain conveyor to be changed, while permitting system accessories, and portions of the splice box itself, to be reused with the conveyor of different width.

2. Description of the Related Art

Conveyor systems, particularly of the type that are generally known as "chain conveyors," have a predetermined width and generally are formed of sections of conveyor lengths that are spliced to one another at a splice box to form a continuous chain conveyer. The two lengths of the chain conveyor that are desired top be spliced are typically coupled to a splice box, which additionally may be adapted to be coupled to a support member that holds the chain conveyor at a desired height, typically in combination with other support members also coupled to other splice boxes.

It generally is desired that the splice boxes be strong and rigid to ensure that the conveyor sections coupled thereto are maintained in alignment with one another and to minimize undesirable displacement of the chain conveyor with respect to its support structure in response to vibrations or other similar effects resulting from conveyor operation. Thus, the splice boxes that couple the conveyor lengths to one another and possibly to a support structure, typically have been formed of welded components.

In modern manufacturing, production, and/or packaging plants, it is desired to adapt the conveyor systems to different needs and operations, oftentimes requiring variations in the width of a chain conveyor. In such systems, it is desirable to be able to change the conveyor structures to different widths. Ordinarily, however, the entire splice box must be changed to one that can accommodate a different width, and this results in additional cost and complexity. There is a need, therefore, for an arrangement that readily permits the width of a conveyor system to be changed, without undue complexity or expense.

It is, therefore, an object of this invention to provide an arrangement that facilitates changing the width of a tabletop chain conveyor.

It is another object of this invention to provide an arrangement that permits the width of a conveyor to be changed while allowing reuse of accessory equipment, such as support legs, drives, and guard rails.

It is also an object of this invention to provide an arrangement that allows the width of a conveyor to be changed over a wide range of sizes, from approximately 2¼" to approximately 18" in width.

It is a further object of this invention to provide a splice box arrangement that permits the width of a conveyor to be changed while allowing reuse of portions of the splice box itself.

It is additionally an object of this invention to provide a splice box arrangement that simply and inexpensively facilitates changing the width of a conveyor.

It is yet a further object of this invention to provide a splice box arrangement that permits the width of a conveyor to be changed while minimizing the number of parts and components that are useful only for specific widths.

It is also another object of this invention to provide a splice box arrangement that can be disassembled and reassembled easily to permit a variety of conveyor widths to be accommodated.

SUMMARY OF THE INVENTION

The foregoing and other objects are achieved by this invention which provides, in a first apparatus aspect thereof, a splice box arrangement for a conveyor of the type wherein segments of a conveyor are spliced together to form a continuous conveyor. In accordance with the invention, the splice box is provided with first and second end members, each of which are formed of a substantially planar material, each such end member being provided with a central portion having first and second sides with a plurality of central portion apertures therethrough. A first angled portion extends outward from, and substantially orthogonal to, the first side of the central portion, with a plurality of first angled portion apertures therethrough. Each end member further has a second angled portion, arranged distal from and substantially parallel to, the first angled portion, and extending outward from, and substantially orthogonal to, the first side of the central portion. A plurality of second angled portion apertures are arranged therethrough, the first and second end members being arranged distal from one another with their respective central portion first sides facing one another. A base member is arranged to extend at least from the first end member to the second end member, the base member having a plurality of base member apertures arranged in registration with the second angled portion apertures of the first and second end members. A top member is arranged to extend at least from the first end member to the second end member, the top member having a plurality of top member apertures arranged in registration with the first angled portion apertures of the first and second end members.

In one embodiment of the invention, the top member is coupled to an inward side of the first angled portion of each of the first and second end members. The various end, top, and base portions of the splice box arrangement are joined with unfastenable fastening devices. The unfastenable fastening devices include a plurality of fasteners that are removably engaged with the top member and respective ones of the first angled portions of the first and second end members.

In another embodiment of the invention, the central portion apertures of the first and second end members are arranged in respective ones of first and second central portion aperture patterns. The patterns may be mirror images of one another. There are additionally provided first and second side frames coupled to respective ones of the first and second end members.

In accordance with a further aspect of the invention, an arrangement is provided for connecting together segments of a conveyor having a predetermined width to form a substantially continuous conveyor chain. In accordance with this further aspect of the invention, first and second end members, each having a central portion having first and second sides, and first and second edge portions on opposite edges of the central portion, the first and second end members being arranged distal from one another with their respective central portion first sides facing one another. A base member is arranged to extend at least from the first end member to the second end member, the base member having a first base member length which is responsive to the predetermined width of the conveyor. A top member is arranged also to extend from at least the first end member to the second end member, the top member having a first top member length which is responsive to the predetermined width of the conveyor. There are further provided fasteners for removably fastening the base member and the top member to respective edge portions of the first and second end members.

In accordance with a specific embodiment of this further aspect of the invention, a further base member is provided having a second base member length which is responsive to the width of a further conveyor having a second predetermined width, and a further top member is provided having a second top member length which is responsive to the width of the further conveyor. The further base and top members are used when the conveyor is changed to one having a corresponding width. Preferably, the predetermined conveyor width which is accommodated by the invention ranges from approximately between 2¼ inches and 18 inches.

In the practice of a specific illustrative embodiment of this further aspect of the invention, the first and second end members each are formed of a substantially planar material, the central portion having first and second sides with a plurality of central portion apertures therethrough. The first edge portion is provided with a first angled portion that extends outward from, and substantially orthogonal to, the first side of the central portion, with a plurality of first angled portion apertures therethrough. The second edge portion is provided with a second angled portion, arranged distal from and substantially parallel to, the first angled portion, extending outward from, and substantially orthogonal to, the first side of the associated central portion. A plurality of second angled portion apertures are arranged therethrough, the first and second end members being arranged distal from one another with their respective central portion first sides facing one another.

In a further embodiment, the unfastenable fasteners are removably engaged with the top member and respective ones of the first angled portions of the first and second end members.

In a further embodiment, first and second side frames are provided, coupled to respective ones of the first and second end members.

In accordance with a still further aspect of the invention, a splice box arrangement is provided for a conveyor of the type wherein segments of a conveyor having a first predetermined conveyor width are spliced together to form a continuous conveyor. In accordance with the invention, the splice box is provided with first and second end members each being formed of a substantially planar material and arranged to have a central portion having first and second sides with a plurality of central portion apertures therethrough. First and second angled portions extend outward from, and substantially orthogonal to, the first side of the central portion. The first and second end members are arranged distal from one another with their respective central portion first sides facing each other. A base member is arranged to extend at least from the first end member to the second end member, the base member being adapted to be removably coupled to the second angled portions of the first and second end members. Additionally, a top member is arranged to extend at least from the first end member to the second end member, the top member being adapted to be removably coupled to the first angled portions of the first and second end members.

In a specific illustrative embodiment of the further aspect of the invention, the conveyor is of the type wherein segments of a conveyor having a second predetermined conveyor width are spliced together to form a continuous conveyor. The splice box is provided with a further base member arranged to extend at least from the first end member to the second end member, and has a base member length which is responsive to the second predetermined conveyor width. The base member additionally is adapted to be removably coupled to the second angled portions of the first and second end members. Additionally, there is provided a further top member which is arranged to extend at least from the first end member to the second end member, the further top member having a top member length which is responsive to the second predetermined conveyor width. The further top member is adapted to be removably coupled to the first angled portions of the first and second end members.

In a further embodiment, the further base and top members are adapted to be removably coupled to respective ones of the first and second angled portions of the first and second end members by means of apertures through the further base and top members. The apertures are arranged to register with corresponding further apertures in the first and second angled portions of the first and second end members. Additionally, there is further provided a plurality of removable fasteners disposed through the apertures through the further base and top members and through the corresponding further apertures in the first and second angled portions of the first and second end members. In a preferred embodiment, the plurality of removable fasteners are a corresponding plurality of threaded fasteners.

BRIEF DESCRIPTION OF THE DRAWING

Comprehension of the invention is facilitated by reading the following detailed description, in conjunction with the annexed drawing, in which.

DETAILED DESCRIPTION

Figure 1:
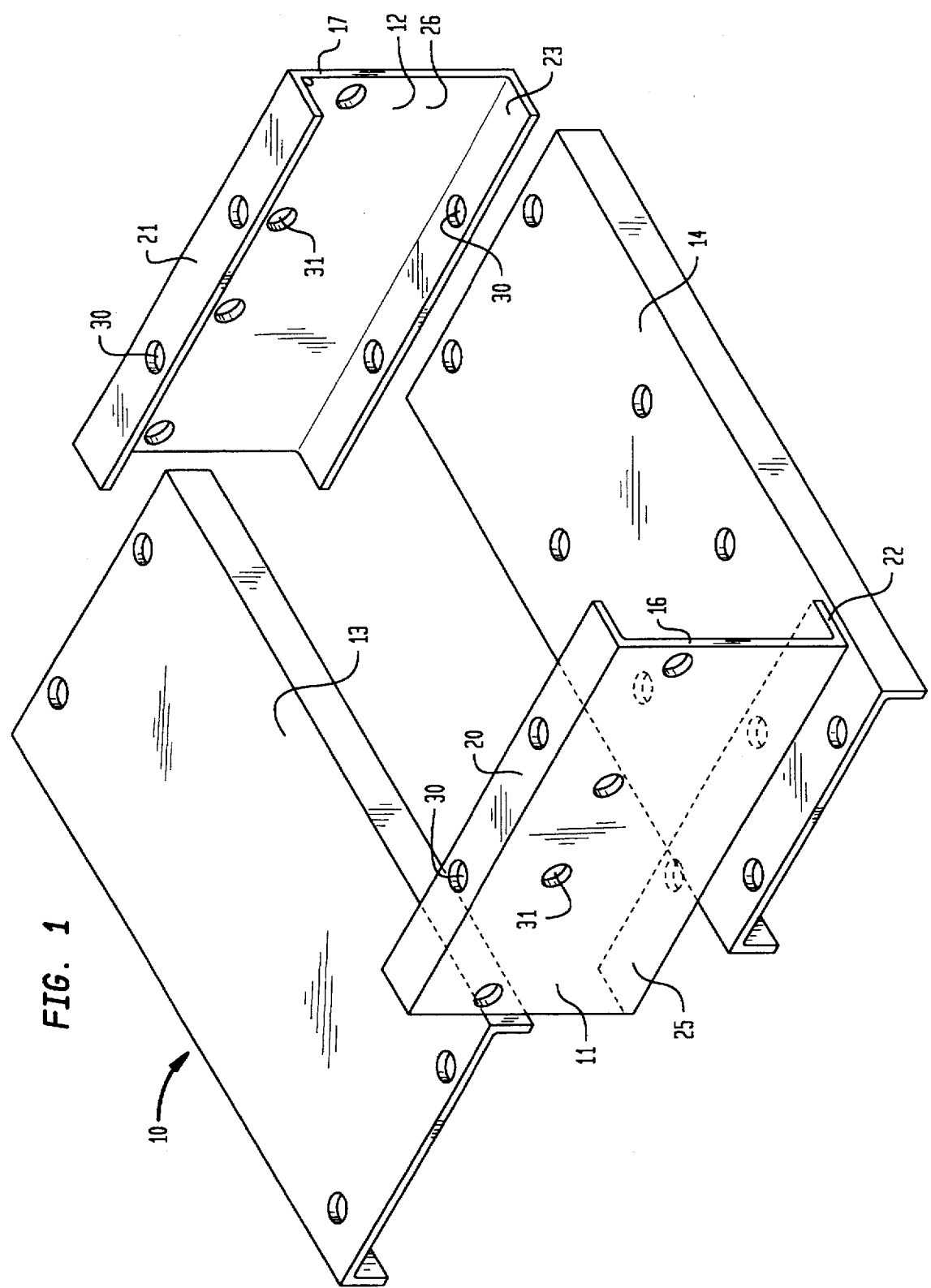
FIG. 1 is an exploded isometric representation of a splice box arrangement constructed in accordance with the principles of the invention.

FIG. 1 is an exploded isometric representation of a splice box arrangement 10 constructed in accordance with principles of the invention. As shown, splice box arrangement 10 is provided with an end portion 11, another end portion 12, a top member 13, and a base member 14. In this specific illustrative embodiment of the invention, end portions 11 and 12 are identical to one another, and each is provided with a respective one of central portions 16 and 17, each having, integrally formed therewith, an associated one of first angled portions 20 and 21, and respective second angled portions 22 and 23.

In this embodiment, central portion 16 of end portion 11 is formed of a substantially planar material having a first side (not shown in this figure) and second side 25. Similarly, central portion 17 of end portion 12 has a first side 26 and second side (not shown in this figure). First angled portions 20 and 21 of the end portions, and second angled portions 22 and 23 are substantially parallel to one another and are directed in the direction of the respective first sides of the end portions. The angled portions are also provided with apertures 30 therethrough which are arranged to register with corresponding apertures through the top member and the base member. In addition, in this specific embodiment, end portions 11 and 12 have further apertures 31 through their respective central portions, apertures 31, in this embodiment, being arranged in a symmetrical aperture pattern.

Figure 2:
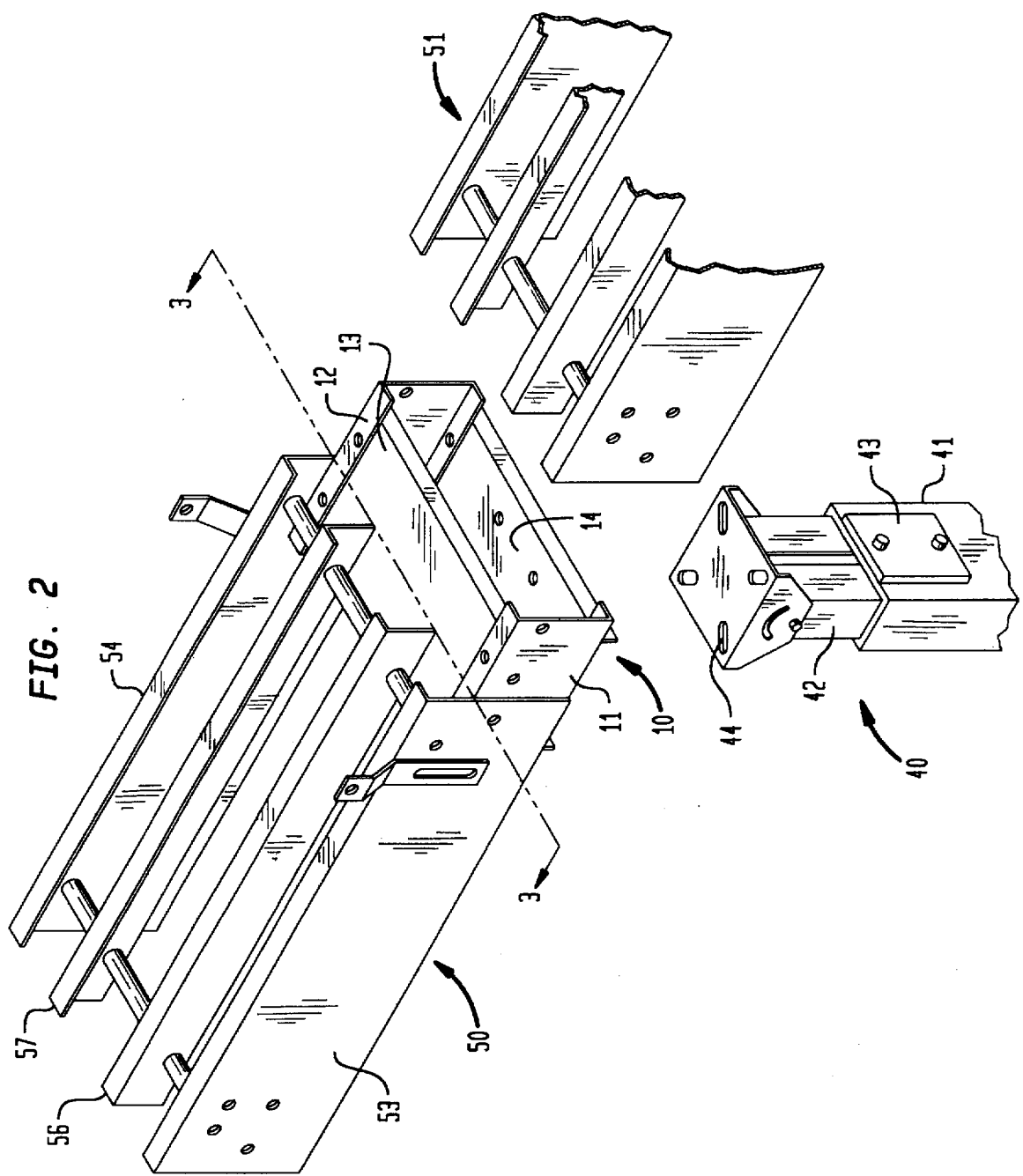
FIG. 2 is an exploded isometric representation of the splice box arrangement of FIG. 1 showing the manner in which the splice box is employed to support a pair of conveyor sections desired to be coupled to one another.

FIG. 2 is an exploded isometric representation of the splice box arrangement of FIG. 1 which is useful to illustrate the manner in which the splice box will permit conveyor portions 50 and 51 to be coupled together, and to be supported by a telescopic support 40. Splice box 10, as previously described, is provided with base member 14 having a plurality of apertures therethrough. The apertures are configured to register with an adjustable coupler 44 of telescopic support 40. In this specific embodiment, telescopic support 40 is formed of telescopic portions 41 and 42 that are telescopically engaged with one another and that can be fixed with respect to one another by tightening a fixation plate 43 in a conventional manner. Adjustable coupler 44 is installed at the upper end of telescopic portion 42 and has, on an uppermost surface thereof, a plurality of apertures that are arranged to register with the apertures through base member 14. Conveyor section 50, which is identical to conveyor section 51, is shown to have a pair of guard rails 53 and 54 that are coupled to one another via spacers, such as spacers 55, with conveyor support rails 56 and 57 therebetween. Guard rails 53 and 54 are separated from one another by a distance that corresponds to the width of splice box 10. Preferably, the splice box has a width which varies from approximately 2¼ inches to 18 inches. The guard rails have apertures therethrough that are arranged to register with the apertures through the end portions of the splice box.

Figure 3:
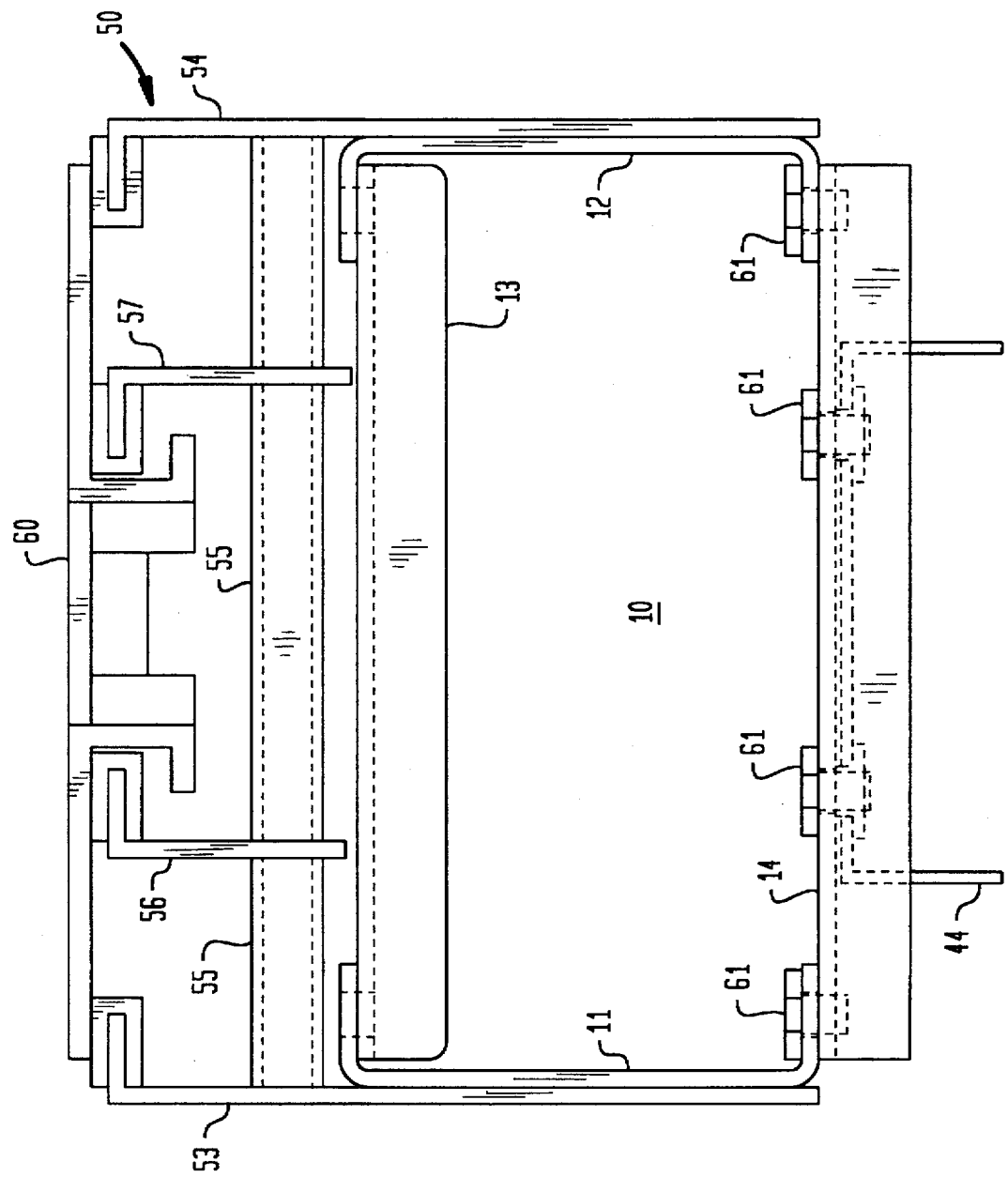
FIG. 3 is a partially cross-sectional schematic end view of the splice box arrangement, taken along line 3—3 of FIG. 2, illustrating the conveyor arrangement installed thereon.

FIG. 3 is a partially cross-sectional end view of splice box 10 taken along line 3—3 of FIG. 2. Elements of structure that correspond to those described herein with respect to FIGS. 1 and 2 are similarly designated. This figure shows guard rail 53 coupled to end portion 11, and guard rail 54 coupled to end portion 12. The guard rails are coupled to one another with the use of spacers 55 that secure conveyor rails 56 and 57, and maintain the guard rails distal from one another by a distance that corresponds to the distance across the end portions of the splice box. Guard rails 53 and 54 and conveyor rails 56 and 57 support a conventional conveyor chain 60, which has a predetermined width. When it is desired to change the conveyor chain to a conveyor chain having a different width, unfastenable fasteners, such as bolts 61, are removed to facilitate replacement of the top and base portions of the splice box.

Although the invention has been described in terms of specific embodiments and applications, persons skilled in the art can, in light of this teaching, generate additional embodiments without exceeding the scope or departing from the spirit of the claimed invention. Accordingly, it is to be understood that the drawing and description in this disclosure are proffered to facilitate comprehension of the invention, and should not be construed to limit the scope thereof

What is claimed is:

1. A splice box arrangement for a conveyor of the type wherein first and second segments of the conveyor, each having a predetermined conveyor width, are each provided with respective first and second side frames, the corresponding side frames of the segments being spliced together to form a continuous conveyor, the splice box arrangement comprising:

first and second end members each being formed of a substantially planar material and arranged to have:

a central portion having first and second sides with a plurality of central portion apertures therethrough for facilitating coupling thereto of the respective first and second side frames, a first angled portion extending outward from, and substantially orthogonal to, said first side of said central portion, with a plurality of first angled portion apertures therethrough, and a second angled portion, arranged distal from, and substantially parallel to, said first angled portion, extending outward from, and substantially orthogonal to, said first side of said central portion, with a plurality of second angled portion apertures therethrough, said first and second end members being arranged distal from one another with their respective central portion first sides facing each other;

a base member arranged to extend at least from said first end member to said second end member, said base member having a plurality of base member apertures arranged in registration with said second angled portion apertures of said first and second end members; and a top member arranged to extend for a predetermined top member length corresponding at least from said first end member to said second end member, said top member having a plurality of top member apertures arranged in registration with said first angled portion apertures of said first and second end members, the predetermined top member length being responsive to the predetermined conveyor width.

2. The splice box arrangement of claim 1, wherein said top member is coupled to an inward side of said first angled portion of each of said first and second end members.

3. The splice box arrangement of claim 1, wherein there is further provided unfastenable fastening means for coupling said top member and respective ones of said first angled portions of said first and second end members.

4. The splice box arrangement of claim 3, wherein said unfastenable fastening means comprises a plurality of fasteners removably engaged with said top member and respective ones of said first angled portions of said first and second end members.

5. The splice box arrangement of claim 1, wherein said central portion apertures of said first and second end members are arranged in respective first and second central portion aperture patterns.

6. The splice box arrangement of claim 5, wherein said first and second central portion aperture patterns are mirror images of one another.

7. The splice box arrangement of claim 1, wherein the central portion apertures are configured to register with corresponding apertures in the first and second side frames, for coupling the first and second side frames to respective ones of said first and second end members.

8. An arrangement for connecting together segments of a conveyor having a predetermined width between side frames to form a substantially continuous conveyor chain, the arrangement comprising:

first and second end members each having a central portion having first and second sides, and first and second edge portions on opposite edges of said central portion, said first and second end members being arranged distal from one another with their respective central portion first sides facing each other, the central portions being arranged to communicate on their second sides with respective ones of the side frames of the conveyor;

a base member arranged to extend at least from said first end member to said second end member, said base member having a first base member length that is responsive to the predetermined width of the conveyor;

a top member arranged to extend at least from said first end member to said second end member, said top member having a first top member length that is responsive to the predetermined width of the conveyor; and fastening means for removably fastening said base member and said top member to respective edge portions of said first and second end members.

9. The arrangement of claim 8, wherein there are further provided a further base member having a second base member length that is responsive to the width of a further conveyor having a second predetermined width, and a further top member having a second top member length that is responsive to the width of said further conveyor.

10. The arrangement of claim 8, wherein said first and second end members each are formed of a substantially planar material, said central portion having first and second sides with a plurality of central portion apertures therethrough, said first edge portion is provided with a first angled portion extending outward from, and substantially orthogonal to, said first side of said central portion, with a plurality of first angled portion apertures therethrough, and said second edge portion is provided with a second angled portion, arranged distal from, and substantially parallel to, said first angled portion, extending outward from, and substantially orthogonal to, said first side of said central portion, with a plurality of second angled portion apertures therethrough, said first and second end members being arranged distal from one another with their respective central portion first sides facing each other.

11. The arrangement of claim 10, wherein said unfastenable fastening means comprises a plurality of fasteners removably engaged with said top member and respective ones of said first angled portions of said first and second end members.

12. The arrangement of claim 8, wherein there are further provided first and second side frames coupled to respective ones of said first and second end members.

13. A splice box arrangement for a conveyor of the type wherein segments of a conveyor having a first predetermined conveyor width across side frames thereof are spliced together to form a continuous conveyor, the splice box comprising:

first and second end members each being formed of a substantially planar material and arranged to have a central portion having first and second sides with a plurality of central portion apertures therethrough, first and second angled portions extending outward from, and substantially orthogonal to, said first side of said central portion, said first and second end members being arranged distal from one another with their respective central portion first sides facing each other, the central portions being arranged to communicate on their second sides with respective ones of the side frames of the conveyor;

a base member arranged to extend at least from said first end member to said second end member, said base member being adapted to be removably coupled to said second angled portions of said first and second end members; and a top member having a first top member length that is responsive to the first predetermined conveyor width, said top member being arranged to extend at least from said first end member to said second end member, said top member being adapted to be removably coupled to said first angled portions of said first and second end members.

14. The splice box arrangement of claim 13, wherein the conveyor is of the type wherein segments of a conveyor having a second predetermined conveyor width are spliced together to form a continuous conveyor, the splice box comprising:

a further base member arranged in place of said base member to extend at least from said first end member to said second end member, said further base member having a base member length that is responsive to the second predetermined conveyor width and being adapted to be removably coupled to said second angled portions of said first and second end members; and a further top member arranged in place of said top member to extend at least from said first end member to said second end member, said further top member having a second top member length that is responsive to the second predetermined conveyor width and being adapted to be removably coupled to said first angled portions of said first and second end members.

15. The splice box arrangement of claim 14, wherein said further base and top members are adapted to be removably coupled to respective ones of said first and second angled portions of said first and second end members by means of apertures through said further base and top members, arranged to register with corresponding further apertures in said first and second angled portions of said first and second end members.

16. The splice box arrangement of claim 15, wherein there are further provided a plurality of removable fasteners disposed through said apertures through said further base and top members and through said corresponding further apertures in said first and second angled portions of said first and second end members.

17. The splice box arrangement of claim 16, wherein said plurality of removable fasteners comprises a plurality of threaded fasteners.

18. The splice box arrangement of claim 14, wherein said second predetermined conveyor width is within a range of approximately between 2¼ inches and 18 inches.

* * * * *